US005567214A

United States Patent [19]
Ashley

[11] Patent Number: 5,567,214
[45] Date of Patent: Oct. 22, 1996

[54] PROCESS FOR PRODUCTION OF ALUMINA/ZIRCONIA MATERIALS

[75] Inventor: Peter J. Ashley, Madison, Ala.

[73] Assignee: Saint-Gobain/Norton Industrial Ceramics Corporation, Worcester, Mass.

[21] Appl. No.: 434,087

[22] Filed: May 3, 1995

[51] Int. Cl.$^6$ .................................................. C09C 1/68
[52] U.S. Cl. ................................. 51/309; 51/293; 264/5; 501/100; 501/101; 501/104; 501/105; 501/107
[58] Field of Search .................................... 501/100, 101, 501/104, 105, 107; 51/293, 307, 309; 264/5

[56] References Cited

U.S. PATENT DOCUMENTS

| | | | |
|---|---|---|---|
| 3,781,172 | 12/1973 | Pett et al. ........................... | 51/309 |
| 3,891,408 | 6/1975 | Rowse et al. ...................... | 51/295 |
| 4,457,767 | 7/1984 | Poon et al. ........................ | 51/298 |
| 4,829,028 | 5/1989 | Seki et al. ......................... | 501/107 |
| 4,992,396 | 2/1991 | McGarry et al. .................. | 501/107 |
| 5,143,522 | 9/1992 | Gibson et al. ..................... | 51/295 |
| 5,183,610 | 2/1993 | Brog et al. ........................ | 501/104 |
| 5,214,011 | 5/1993 | Breslin .............................. | 501/104 |

Primary Examiner—Deborah Jones
Attorney, Agent, or Firm—David Bennett

[57] ABSTRACT

A process is described for the production of alumina/zirconia materials which uses cheap scrap alumina/zirconia/silica material as feedstock along with a reducing agent to lower the final silica content to an acceptable level.

6 Claims, No Drawings

PROCESS FOR PRODUCTION OF ALUMINA/ZIRCONIA MATERIALS

BACKGROUND OF THE INVENTION

This invention relates to fused alumina/zirconia materials which have found wide applicability, especially in the field of abrasives. The invention relates particularly to a process for making such materials that has significant cost advantages over those currently practiced in the art.

It is well known from patents such as U.S. Pat No. 3,454,385; 3,891,408; 4,454,767 and 5,143,522 that alumina and zirconia can be co-fused in the same vessel and then formed in to very useful abrasive grains, particularly when the process is manipulated to ensure that the zirconia in obtained in the tetragonal form.

However the very nigh cost of the zirconia component has made it difficult for the grain to be as widely accepted as its undoubted utility as an abrasive would seem to justify.

A process has now been discovered that enables a very low cost source of zirconia to be used, thus making this very valuable abrasive grain accessible at a more moderate price.

GENERAL DESCRIPTION OF THE INVENTION

The present invention provides a process for the production of alumina/zirconia abrasives which comprises forming a melt comprising alumina/zirconia/silica (AZS) scrap, adding to the melt an amount of a reducing agent sufficient to reduce the silica content to a level below about 0.8% by weight and then forming abrasive grits from the melt.

"AZS scrap" as the term is used herein refers to waste material generated as a result of the use of large AZS blocks to line glass furnaces. Periodically these linings have to be replaced and the discarded blocks of AZS become scrap to be disposed of as economically as possible. The original composition of AZS blocks used to line glass furnaces is from about 48 to about 50 wt % of alumina; from about 30 to about 35 wt % of zirconia; and from about 12 to about 18 wt % of silica. Scrap generated in the production of such blocks is one preferred source of AZS scrap. Scrap generated when such blocks are replaced is a secondary though occasionally less desirable source.

During use the AZS blocks may become contaminated with up to about 2–3% of glass. Certain components of the glass such as silica and soda can be quite detrimental to the abrasive properties of any grains produced from such starting materials unless special precautions are taken to eliminate them, or at least to reduce them to acceptable levels during the production process. Other components such lead, (when the glass produced in the furnace is a lead crystal), produce other very significant environmental problems such that AZS contaminated in this way is very much less preferred as a feedstock.

It has now been found that AZS scrap materials can be used effectively, either alone or in admixture with appropriate amounts of alumina and zirconia to adjust the final composition to the desired alumina/zirconia ratio, if a reducing agent selected from the group consisting of carbon, aluminum, magnesium, zirconium and mixtures of the above is added to a melt of the AZS and any other starting materials in an amount sufficient to reduce the silica content of the final product to below 0.8 wt % and more preferably below 0.4 wt %. This amount will depend on the amount of impurity in the AZS and the silica content of the AZS itself. However for most purposes an amount that is from about 5 to about 30%, and more preferably from about 10 to about 20%, based on the weight of the molten components, may be used with advantage.

The preferred reducing agents are carbon and aluminum and mixtures of these. Magnesium and zirconium both raise handling problems and for that reason are less preferred. The most preferred reducing agent is a mixture of carbon and aluminum in a weight ratio of from 1:0 to 1:2.

DESCRIPTION OF PREFERRED EMBODIMENTS

The invention is now described with particular reference to the following Examples which are for the purposes of illustration only and are intended to imply no essential limitation on the scope of the invention.

EXAMPLE 1

In a conventional process for the manufacture of an alumina/zirconia abrasive using a fusion mixture of 35% by weight of zirconia and 64% by weight of alumina, varying proportions of the conventional alumina/zirconia feed were replaced by AZS scrap.

The reducing agent chosen was a mixture of carbon and aluminum metal in the form of chips.

The AZS fed in to the melt comprised about 49% alumina, about 37% zirconia and about 14% silica, all proportions being by weight. The AZS scrap did not have any glass contamination.

Five runs were performed with varying amounts of the total normal alumina/zirconia charge replaced by AZS scrap. The abrasive grits obtained were analyzed and the power used to process the melt, (a measure of the efficiency of the process), was measured. The results are set out in Table 1 below.

TABLE 1

| AZS in FEED | KWH/lb | $SiO_2$ | $Na_2O$ | $ZrO_2$ | C/Al* |
|---|---|---|---|---|---|
| 20% | 1.7 | 0.36 | 0.03 | 32.2 | 4/4 |
| 40% | 1.7 | 0.55 | 0.04 | 34.0 | 4/4 |
| 60% | 1.7 | 0.65 | 0.04 | 33.5 | 6/6 |
| 80% | 1.7 | 0.57 | 0.04 | 34.6 | 6/8 |
| 100% | 2.1 | 0.54 | 0.03 | 32.4 | 8/10 |

*expressed in terms of the percentage of the total weight of the feedstock represented by each component.

From the above data it is clear that an alumina/zirconia feedstock comprising impure AZS scrap can be used and the critical silica and soda contents can be controlled, providing appropriate amounts of suitable reducing agents are used.

EXAMPLE 2

The zirconia content of the materials made in the following Examples was to be at least 25% by weight. In the Examples, all the zirconia was supplied by AZS scrap and the reducing agent used was carbon alone in the form of petroleum coke. Thus the feed comprised alumina, AZS scrap and coke. The same AZS scrap used in Example 1 was used in this Example.

The coke was added in two increments: the first, (I), with the feedstock and the second, (II), during the "fuseout" period after the molten mass had been formed but before the molten mass was tapped off and the cooling process had begun.

The results are set forth in Table 2 below.

TABLE 2

| MATERIAL ADDED | Test A | Test B | Test C | Test D |
| --- | --- | --- | --- | --- |
| Alumina | 19.5 | 19.5 | 19.5 | 19.5 |
| AZS | 36.75 | 36.75 | 36.75 | 36.75 |
| Coke (I) | 1 | 1 | 1.5 | 1.5 |
| Coke (II) | 1 | 1.5 | 1 | 1.5 |
| RESULTS | | | | |
| Silica | 0.59 | 0.58 | 0.63 | 0.31 |
| Zirconia | 28.9 | 28.5 | 29.5 | 23.4 |
| Power (KWH/lb) | 3.45 | 2.06 | 2.04 | 2.78 |

The Power value for Test "A" includes the energy used to start and heat up the furnace. The high value for Test "D" results from the small amount of the product tapped from the furnace due to the presence of unburned carbon in the melt because of the small size of the furnace. Such conditions would not be created in a production-size furnace. It is considered that, at steady state operations, a power consumption of around 2 KWH per pound of grain produced is entirely achievable.

What is claimed is:

1. A process for the production of an alumina/zirconia material which comprises forming a melt comprising AZS scrap and adding to the melt an amount of a reducing agent selected from the group consisting of carbon, aluminum, magnesium zirconium and mixtures thereof sufficient to reduce the silica content to a level below about 1.0% by weight.

2. A process according to claim 1 in which alumina and/or zirconia are also added to the melt to produce an alumina/zirconia material.

3. A process according to claim 1 in which the reducing agent is added in an amount that is from about 10 to about 20% of the weight of the melt.

4. A process according to claim 1 in which the AZS scrap comprises from about 48 to about 50% alumina, from about 30 to about 35% of zirconia and from about 12 to about 18% of silica, all percentages being by weight.

5. A process for the production of an alumina/zirconia abrasive grits which comprises forming a melt comprising AZS scrap which comprises from about 48 to about 50% alumina, from about 32 to about 37% of zirconia and from about 12 to about 15% of silica, (all percentages being by weight), and adding to the melt an amount of a reducing agent selected from the group consisting of carbon, aluminum, magnesium zirconium and mixtures thereof sufficient to reduce the silica content of the melt to a level below about 1.0% by weight and then casting the melt into blocks and comminuting said blocks to form abrasive grits.

6. A process according to claim 5 in which the reducing agent is added in an amount that is from about 4 to about 20% of the weight of the melt.

* * * * *